US011990294B2

(12) United States Patent
Wang

(10) Patent No.: US 11,990,294 B2
(45) Date of Patent: May 21, 2024

(54) SWITCH ASSEMBLY AND POWER TOOL

(71) Applicant: Globe (Jiangsu) Co., Ltd., Changzhou (CN)

(72) Inventor: Doushi Wang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 17/477,562

(22) Filed: Sep. 17, 2021

(65) Prior Publication Data

US 2022/0093353 A1 Mar. 24, 2022

(30) Foreign Application Priority Data

Sep. 23, 2020 (CN) ......................... 202011006740.8

(51) Int. Cl.

| | |
|---|---|
| ***H01H 21/22*** | (2006.01) |
| ***B25F 5/02*** | (2006.01) |
| ***H01H 3/20*** | (2006.01) |
| ***H01H 9/20*** | (2006.01) |
| ***H01H 21/04*** | (2006.01) |

(52) U.S. Cl.

CPC ............... *H01H 21/22* (2013.01); *B25F 5/02* (2013.01); *H01H 3/20* (2013.01); *H01H 9/20* (2013.01); *H01H 21/04* (2013.01)

(58) Field of Classification Search

CPC .......... H01H 21/04; H01H 21/24; H01H 9/20; H01H 9/24; H01H 3/20; H01H 21/22; B23Q 1/0089

See application file for complete search history.

(56) References Cited

U.S. PATENT DOCUMENTS

| | | | | |
|---|---|---|---|---|
| 3,780,246 A * | 12/1973 | Beckering | H01H 3/20 | 200/332.2 |
| 4,050,003 A * | 9/1977 | Owings | H01M 50/247 | 439/481 |
| 7,767,918 B2 * | 8/2010 | Hofmann | H01H 9/06 | 200/50.01 |
| 8,739,894 B2 * | 6/2014 | Schlauch | B25F 5/02 | 16/110.1 |
| 9,266,230 B2 * | 2/2016 | Maddilate | B25F 5/02 | |
| 9,636,792 B2 * | 5/2017 | Mandalka | B25F 5/00 | |
| 10,195,703 B2 * | 2/2019 | Boeck | B25F 5/00 | |
| 10,410,811 B2 * | 9/2019 | Hanai | H01H 25/00 | |
| 11,420,314 B2 * | 8/2022 | Tada | B25D 17/04 | |
| 11,642,771 B2 * | 5/2023 | Luecke | B25F 5/02 | 173/170 |
| 2003/0190877 A1 * | 10/2003 | Gallagher | B24B 55/00 | 451/344 |
| 2011/0005905 A1 | 1/2011 | Fukinuki et al. | | |

(Continued)

*Primary Examiner* — Joshua G Kotis

(57) ABSTRACT

The disclosure provides a switch assembly and a power tool. The switch assembly includes a housing which extends along the longitudinal axis, a main control switch which is housed within the housing, a locking switch which is slidably connected with the housing and can move between a locking position and a releasing position, and a start switch which is rotably connected with the housing by a pivot. The locking switch is in contact with the start switch when the locking switch is in the locking position, and the start switch is in a locked state. The locking switch is disengaged from the start switch when the locking switch is in the releasing position, and the start switch is in a released state.

7 Claims, 5 Drawing Sheets

(56) References Cited

U.S. PATENT DOCUMENTS

| | | | | |
|---|---|---|---|---|
| 2011/0266014 | A1* | 11/2011 | McRoberts | B25F 5/02 173/170 |
| 2015/0367496 | A1* | 12/2015 | Kaupp | B25F 5/02 173/170 |
| 2016/0322183 | A1* | 11/2016 | Vogel | H01H 9/06 |
| 2018/0257191 | A1* | 9/2018 | Kolb | B25F 5/02 |
| 2018/0366286 | A1* | 12/2018 | Moreland, IV | H01H 21/10 |
| 2022/0118596 | A1* | 4/2022 | Hatakeyama | B25F 5/02 |
| 2022/0256774 | A1* | 8/2022 | Shimizu | A01D 34/00 |

* cited by examiner

SWITCH ASSEMBLY AND POWER TOOL

CROSS REFERENCE TO RELATED APPLICATION

The present application is based on, and claims the priority from, Chinese application number CN202011006740.8, filed on Sep. 23, 2020, the disclosure of which is hereby incorporated by reference herein in its entirety for all purposes.

TECHNICAL FIELD

The disclosure relates to a switch assembly and power tool which belongs to the technical field of garden tools.

BACKGROUND

At present, the power tool is usually provided with a handle for user to hold, on which a start switch is disposed. When user just holds but does not use the power tool, the start switch would be pressed unintentionally to start the power tool by mistake, that will cause some dangerous situations. So a safety switch is needed to be arranged on the power tool to prevent the switch assembly from accidentally starting when the user does not need the power tool to work.

A conventional start switch is typically disposed on the lower side of the handle and faces downward. When using the power tool, holding the handle and pressing the start switch upward at the same time to start the power tool. However existing safety switch is mainly linkage type, if the start switch needs to be actuated, the safety switch needs to be pressed, pushed, or rotated at first, at this time, the lock of the safety switch to the start switch is relieved, and then user can actuate the start switch to start the tool. Based on the above technology, the switch assembly is widely applied to the field of power tools. The grip type switch assembly is most common. The safety switch of the grip type switch assembly is arranged on the upper side of the handle, opposite to the start switch and face upward. When in use, holding the handle of the tool to press the safety switch and then press the start switch. Therefore, the grip type switch is simple in structure and convenient to use, and can be widely applied to the field of power tools.

However, when using the grip type switch assembly mentioned above, there is a defect that it is difficult to significantly distinguish between the action of starting the safety switch and the action of actuating the start switch. Thereby the start switch would be actuated by mistake so that dangerous situation occurs. Under new safety usage regulations of the tools, potentially unsafe factors of the grip type switch assembly limit the further application of the tool.

In view of the above, it is necessary to improve the existing safety switch to solve problems mentioned above.

BRIEF DESCRIPTION OF THE DISCLOSURE

The disclosure provides a switch assembly which is in a locked state when in non-use state. Abnormal start-up cannot occur due to unintentionally pressing.

The present disclosure provides a switch assembly which includes: a housing which extends along the longitudinal axis; a main control switch which is housed within the housing; a locking switch which is slidably connected with the housing and can move between a locking position and a releasing position, wherein an angle of 0° to 60° is formed between the sliding direction of the locking switch and the longitudinal axis; and a start switch which is rotably connected with the housing by a pivot. Wherein the locking switch is in contact with the start switch when the locking switch is in the locking position, and the start switch is in a locked state. The locking switch is disengaged from the start switch when the locking switch is in the releasing position, and the start switch is in a released state.

As a further improvement of the present disclosure, the start switch is disposed on a first side of the housing, the locking switch and the main control switch are disposed on a second side of the housing.

As a further improvement of the present disclosure, the pivot is perpendicular to the longitudinal axis.

As a further improvement of the present disclosure, the locking switch includes: a first operating part which protrudes from the housing, and an abutting part which is housed within the housing. Wherein the abutting part extends from the first operating part toward the start switch, and the abutting part is in contact with the start switch when the locking switch is in the locking position.

As a further improvement of the present disclosure, the first operating part includes a first operating surface and a second operating surface. Wherein the first operating surface extends in a direction parallel to the longitudinal axis, and the second operating surface extends in a direction which forms an angle with the longitudinal axis. Wherein the width of the second operating surface is greater than the width of the first operating surface in a direction perpendicular to the longitudinal axis.

As a further improvement of the present disclosure, the start switch includes: a contact part which is disposed within the housing, and a second operating part which protrudes from the housing. Wherein the contact part is in contact with the main control switch. And the second operating part includes an end surface. Wherein the abutting part is in contact with the end surface when the locking switch is in the locking position. And the abutting part is disengaged from the end surface when the locking switch is in the releasing position.

As a further improvement of the present disclosure, the second operating part is provided with a containing cavity for containing the abutting part.

As a further improvement of the present disclosure, the start switch further includes a middle part. Wherein the middle part connects the contact part and the second operating part, and is provided with a connecting hole. And the connecting hole connects the pivot which is arranged on the inside wall of the housing.

As a further improvement of the present disclosure, the locking switch further includes a main body part which connects the first operating part and the abutting part. Wherein one end of the main body part is provided with a sliding groove which extends in a direction parallel to the longitudinal axis. And a convex column is arranged on the inside wall of the housing and penetrates through the sliding groove.

As a further improvement of the present disclosure, the locking switch further includes an elastic element. Wherein one end of the elastic element is fixed to the main body part, the other end of the elastic element is fixed to the housing. When the locking switch is switched between the locking position and the releasing position, the elastic element is switched between a stretched state and a released state.

As a further improvement of the present disclosure, the angle formed between the sliding direction of the locking switch and the longitudinal axis is from 0° to 15°.

The present disclosure provides a power tool which applies the switch assembly mentioned above. Abnormal start-up cannot occur due to unintentionally pressing.

The present disclosure provides a power tool which includes: a work assembly for implementing the functions of the power tool; a drive assembly which is connected with the work assembly to drive the work assembly to move; a battery assembly which supplies power for the drive assembly; and a switch assembly, including: a housing which extends along a longitudinal axis; a main control switch which is housed within the housing; a locking switch which is slidably connected with the housing and can move between a locking position and a releasing position, wherein an angle of 0° to 60° is formed between the sliding direction of the locking switch and the longitudinal axis; and a start switch which is rotably connected with the housing by a pivot. Wherein the locking switch is in contact with the start switch when the locking switch is in the locking position, and the start switch is in a locked state. The locking switch is disengaged from the start switch when the locking switch is in the releasing position, and the start switch is in a released state.

As a further improvement of the present disclosure, the locking switch includes: a first operating part which protrudes from the housing, and an abutting part which is housed within the housing. Wherein the abutting part extends from the first operating part toward the start switch, and the abutting part is in contact with the start switch when the locking switch is in the locking position.

As a further improvement of the present disclosure, the start switch includes: a contact part which is disposed within the housing, and a second operating part which protrudes from the housing. Wherein the contact part is in contact with the main control switch. And the second operating part includes an end surface. Wherein the abutting part is in contact with the end surface when the locking switch is in the locking position. And the abutting part is disengaged from the end surface when the locking switch is in the releasing position.

As a further improvement of the present disclosure, the second operating part is provided with a containing cavity for containing the abutting part.

The beneficial effects of the present disclosure are: the switch assembly disposes the start switch and the locking switch in opposite positions. And the start switch is arranged to be rotably connected with the housing by the pivot. The locking switch is arranged to be slidably connected with the housing and can move between the locking position and the releasing position along a direction parallel to the longitudinal axis. The locking switch is in contact with the start switch when the locking switch is in the locking position, and then the start switch is in a locked state. The locking switch is disengaged from the start switch when the locking switch is in the releasing position, and then the start switch is in a released state. The switch assembly is ergonomically convenient for operator to manipulate. The switch assembly is in a locked state when in non-use state. In which state the switch assembly will not be started abnormally when the start switch is pressed unintentionally. That can prevent the start switch from being actuated by mistake.

DETAILED DESCRIPTION

In order to make the objectives, technical solutions, and advantages of the disclosure clearer, the drawings combined with embodiments will be described below in detail.

Figure 1:
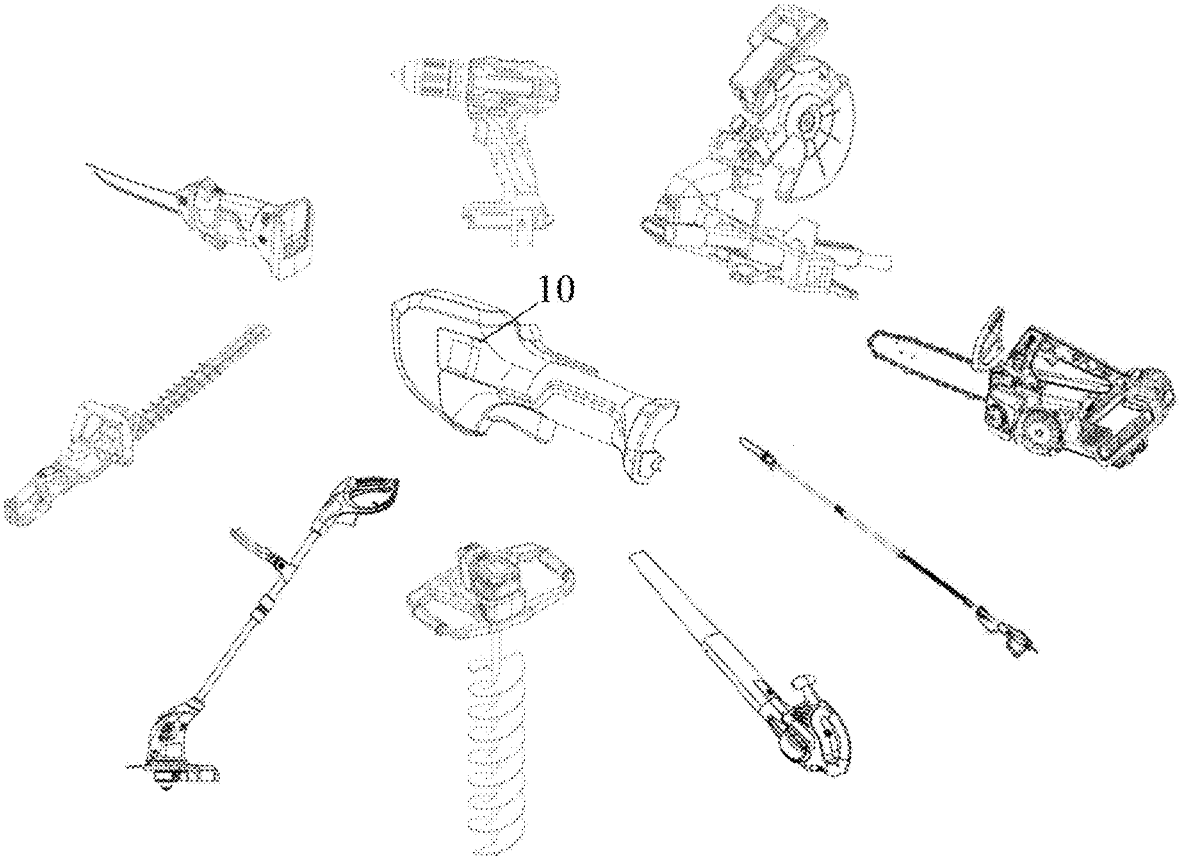
FIG. 1 is a schematic diagram of a power tool of the disclosure.

As shown in FIG. 1, the disclosure provides a power tool which may be a hedge trimmer, an electric saw, a blower, a chain saw or a string trimmer, or other type of hand-held power tool. All of which can be operated by the switch assembly 10 of the disclosure, not limited herein. These power tools may typically include a work assembly, a drive assembly, a battery assembly, and a switch assembly 10 for implementing the functions of the power tool, such as mowing, blowing and the like. The drive assembly may be connected with the work assembly to drive the work assembly to move. The drive assembly may typically be a motor. The battery assembly may supply power for the drive assembly. The switch assembly 10 may be used for starting or closing the power tool (including the drive assembly and the battery assembly).

The switch assembly of the disclosure extends along the longitudinal axis and is disposed like a grip handle for user to operate. As the switch assembly 10 can be applied to varied power tools, the specific structure of the power tool is not limited herein. The specific structure and starting method of the switch assembly will mainly be described below in detail.

Figure 2:
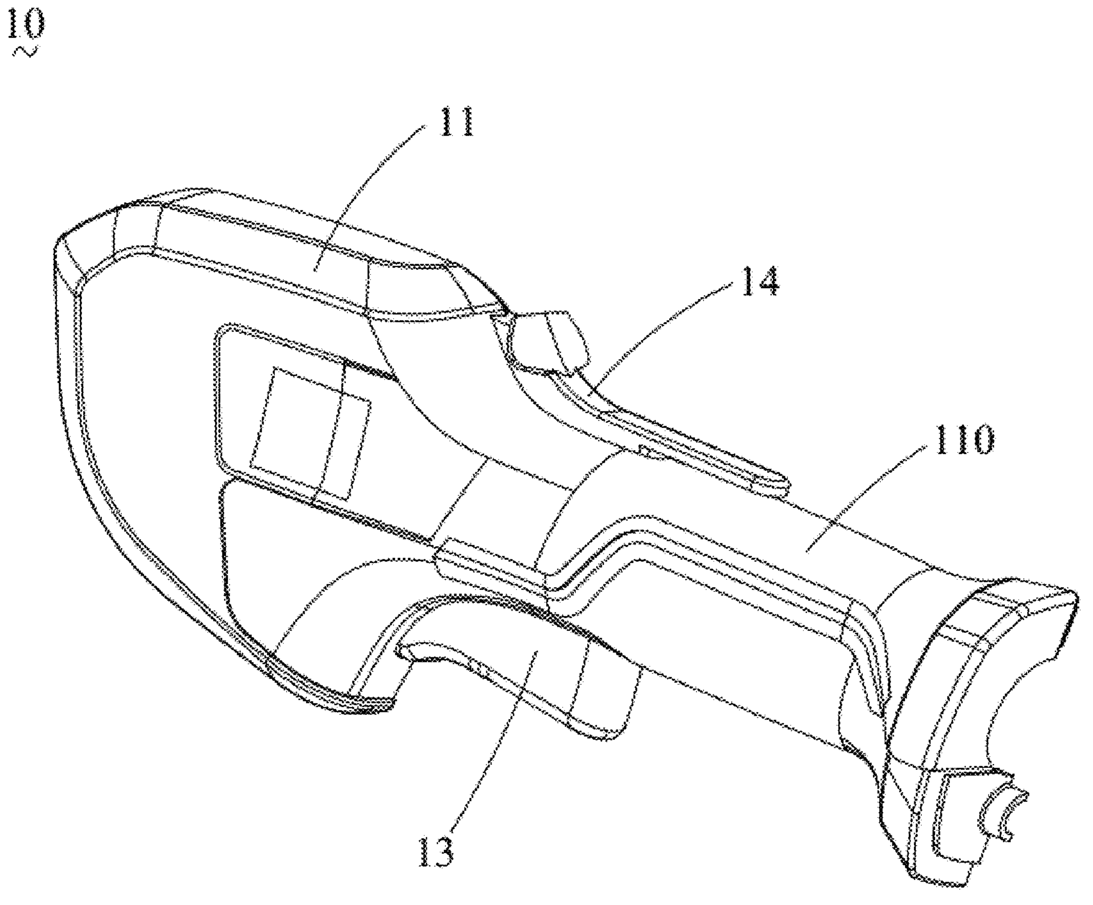
FIG. 2 is a perspective diagram of a switch assembly of the disclosure.
Figure 3:
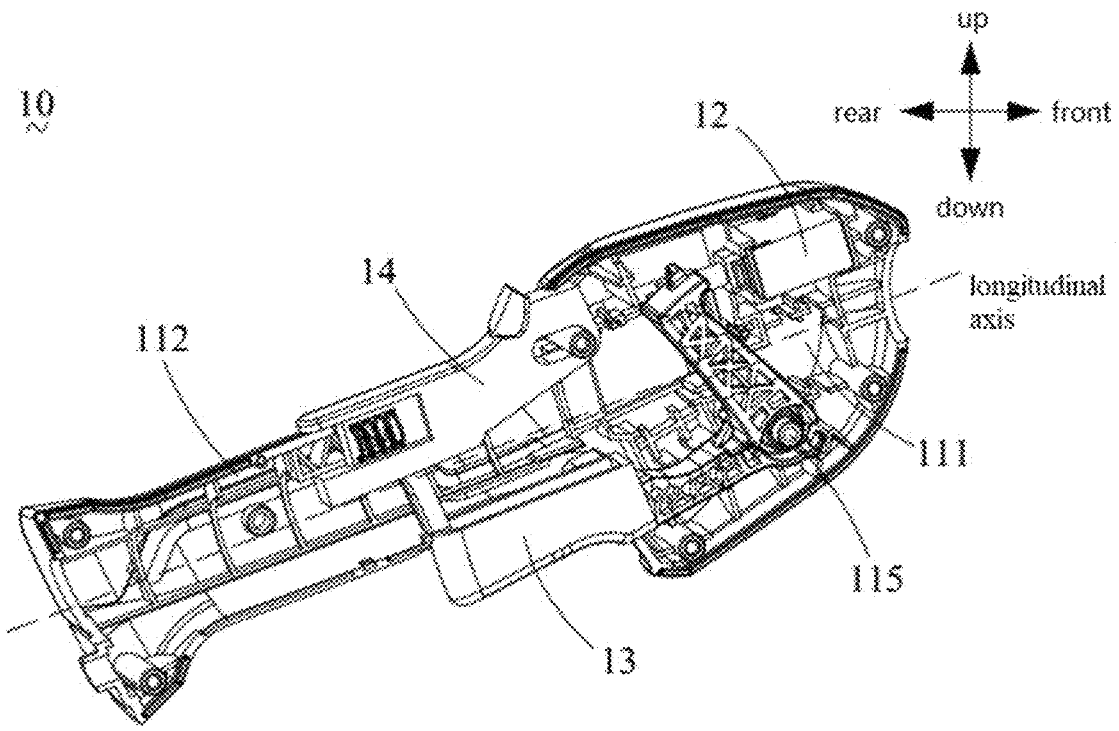
FIG. 3 is a partial structure diagram of the switch assembly shown in FIG. 1.

As shown in FIG. 2 and FIG. 3, the switch assembly 10 may include a housing 11, a main control switch 12 which is housed within the housing 11, and a start switch 13 and a locking switch 14 which are mounted on the housing 11. One end of the locking switch 14 is exposed outside the housing 11, and the other end is in contact with the start switch 13. One end of the start switch 13 is also exposed outside the housing 11, and the other end is housed within the housing 11 and contacts the main control switch 12. The start switch 13 is rotably connected with the housing 11 by a pivot 115 which is perpendicular to the longitudinal axis. The locking switch 14 is slidably connected with the housing 11 to move between a locking position and a releasing position. An angle of 0° to 60° is formed between the sliding direction of the locking switch 14 and the longitudinal axis. Preferably the angle is between 0° and 45°, more preferably between 0° and 30°, and even more preferably between 0° and 15°, thereby enabling an easy application of force by an operator and providing an ergonomic design. In this embodiment, the sliding direction of the locking switch 14 is parallel to the longitudinal axis, and the angle is 0°. In this way, the operation action of the start switch 13 can obviously be distinguished from the operation action of the locking switch 14, which is not only ergonomically be convenient for the operator to manipulate, but also avoids the start switch 13 being actuated by mistake.

Preferably, to make the space of the switch assembly 10 smaller, the start switch 13 is disposed on a first side of the housing 11, the locking switch 14 is located on a second side of the housing 11, and the start switch 13 and the locking switch 14 are disposed opposite with respect to the longitudinal axis. The main control switch 12 is disposed at a front-most end within the housing 11 and located on the second side of the housing 11. In the locking position, the locking switch 14 abuts the start switch 13 to prevent the start switch 13 from rotating. In the releasing position, the locking switch 14 is disengaged from the start switch 13, and allows the start switch 13 to rotate to trigger the main control switch 12. Then the main control switch 12 is turned on and controls the motor (not shown) to start or close.

Figure 4:
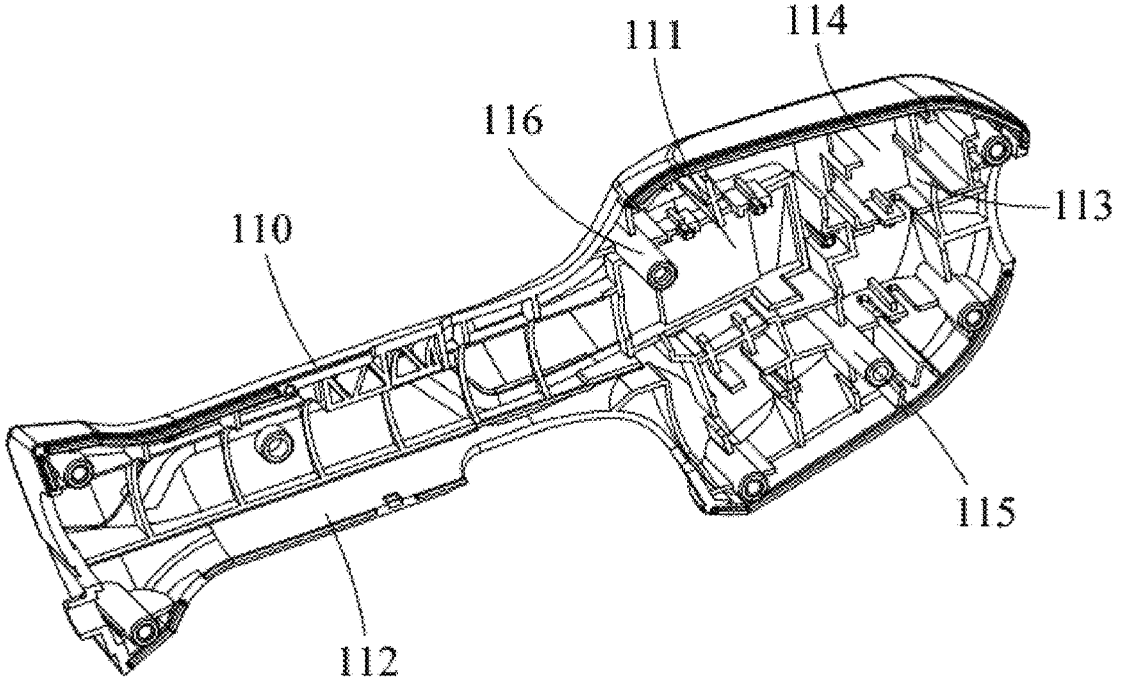
FIG. 4 is a perspective diagram of a first housing shown in FIG. 3.

As shown in FIG. 2 and FIG. 4, the housing 11 is assembled by two housings. The main control switch 12 is housed within the containing space 111 enclosed by the two housings. Taking the first housing 112 as an example, the installation of the main control switch 12, the start switch 13, and the locking switch 14 in the housing will be shown below in detail.

The inside wall of the first housing 112 is provided with a fixing part 113. A containing slot 114, which is connected with the containing space 111, is disposed in the fixing part 113. And the main control switch 12 is housed in the containing slot 114. The inside wall of the first housing 112 is also provided with the pivot 115 and a convex column 116 to separately connect the start switch 13 and the locking switch 14 to the first housing 112. The pivot 115 and the convex column 116 install on or integrally form on the first housing 112. Both the pivot 115 and the convex column 116 may be disposed as columnar, preferably cylindrical. Specifically, the start switch 13 passes through the pivot 115 and rotates about the pivot 115. The locking switch 14 passes through the convex column 116 and can move back and forth in a direction parallel to the longitudinal axis with respect to the convex column 116.

A handle part 110 is formed on the housing 11 for user to hold and operate the switch assembly 10. To make the handle part 110 be hold easier by operator, the start switch 13 is located at the bottom of the handle part 110 and partially protrudes from the handle part 110, and the locking switch 14 is located at the top of the handle part 110 and partially protrudes from the handle part 110. When the switch assembly 10 is started, after holding the handle part 110 directly and pushing the locking switch 14 forward, using the index finger to press the starting switch 13 upward, then the main control switch 12 can be started. The operation is simple and convenient.

Figure 8:
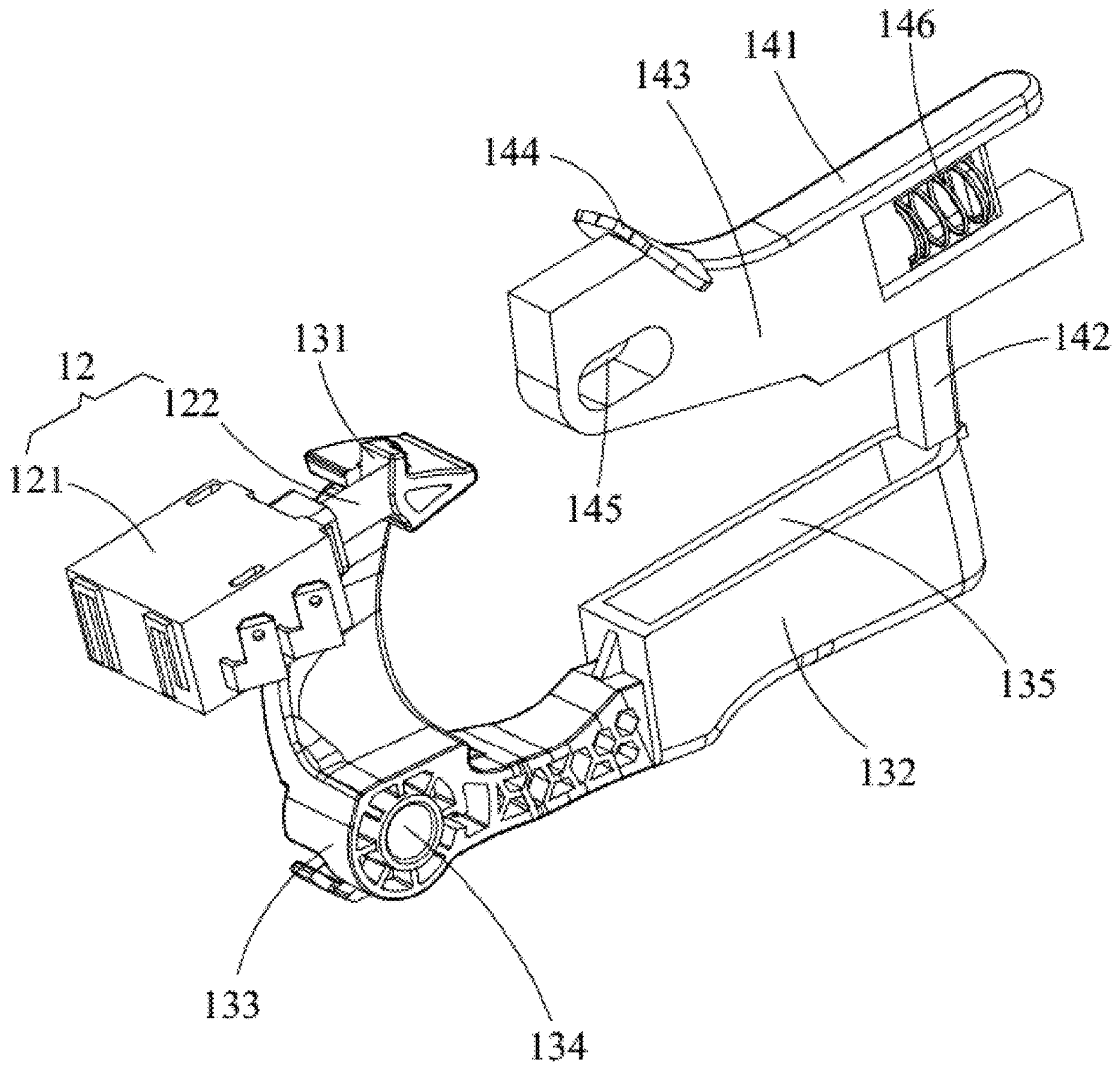
FIG. 8 is a combination structure diagram of the locking switch, the start switch, and a main control switch in a locked state when they are cooperated with each other.

As shown in FIG. 3 and FIG. 8, the main control switch 12 is arranged as press type, and includes a body part 121 and a telescopic arm 122 which is connected with the body part 121. The telescopic arm 122 is elastically disposed to be automatically reset after relieving the pressure. In the embodiment of the disclosure, the main control switch 12 is a micro switch. One end of the start switch 13 is located behind the telescopic arm 122, so that the telescopic arm 122 is triggered (pressed) by the start switch 13 to turn on the main control switch 12.

Figure 5:
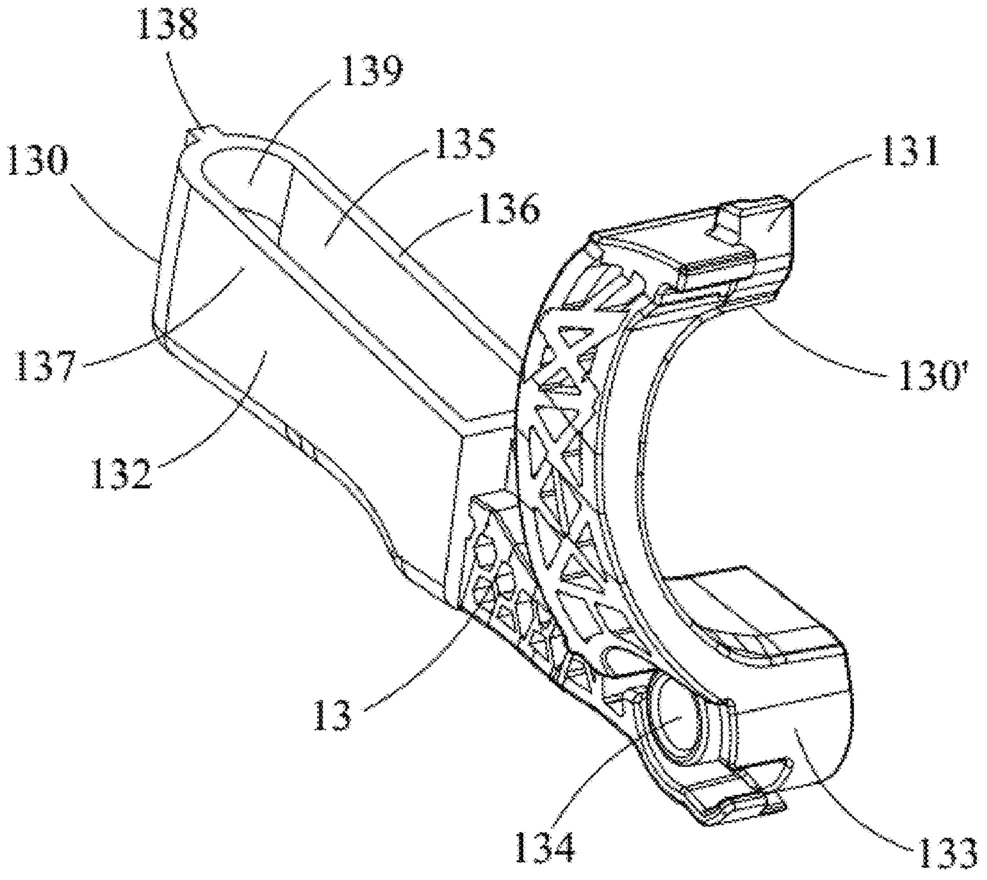
FIG. 5 is a perspective diagram of a start switch shown in FIG. 3.

As shown in FIG. 4 and FIG. 5, the start switch 13 includes a contact part 131 which is in contact with the telescopic arm 122 of the main control switch 12, a second operating part 132 which protrudes from the bottom of the housing 11, and a middle part 133 which connects the contact part 131 and the second operating part 132. Wherein the second operating part 132 is located at a first end 130 of the start switch 13, and the contact part 131 is located at a second end 130' of the start switch 13. The middle part 133 is mounted on the pivot 115, thus the start switch 13 can rotate with regard to the housing 11. And then when the operator grasps the second operating part 132, the contact part 131 can synchronously be driven forward to press the telescopic arm 122 of the main control switch 12, thereby the main control switch 12 is turned on.

The contact part 131 is located at the rear side of the telescopic arm 122, and the surface where the contact part 131 is in contact with the telescopic arm 122 is a flat surface. When the second operating part 132 is grasped, the contact part 131 can synchronously be driven forward to press the telescopic arm 122 of the main control switch 12 to make the main control switch 12 be turned on stably. The middle part 133 is circular and convenient to rotate in the housing 11. The middle part 133 is provided with a connecting hole 134 through which the pivot 115 passes. Preferably the connecting hole 134 is a circular perforation, and the diameter of which is slightly larger than the diameter of the pivot 115, such that the start switch 13 is convenient to rotate about the pivot 115.

The second operating part 132 of the start switch 13 is provided with a containing cavity 135, such that a first side wall 136, a second side wall 137 and a third side wall 139 are formed on the second operating part 132. The containing cavity 135 is located among the first side wall 136, the second side wall 137 and the third side wall 139. In other words, the containing cavity 135 is concave down from the top of the second operating part 132. The rear end of the second operating part 132 is provided with an end surface 138 for contacting the locking switch 14 in a locked state, preferably the end surface 138 and the upper surface of the second operating part 132 are located in the same plane.

The start switch 13 further includes a first elastic element (not shown). One end of the first elastic element is fixed to the middle part 133, and the other end is fixed to the inside wall of the first housing 112. After grasping the second operating part 132, the first elastic element is compressed, and the contact part 131 is driven forward to press the telescopic arm 122 of the main control switch 12 forward to turn on the main control switch 12 to start the motor. After the second operating part 132 is released, the start switch 13 can totally return to the initial position under the restoring force of the first elastic element. At this time, the contact part 131 is disengaged from the telescopic arm 122 of the main control switch 12 to turn off the main control switch 12 and the current of the motor. In the embodiment, the first elastic element is a compression spring mainly for driving the start switch 13 to reset. Certainly, other components which are capable of implementing the reset function can also be used to replace the first elastic element, not limited herein.

Figure 6:
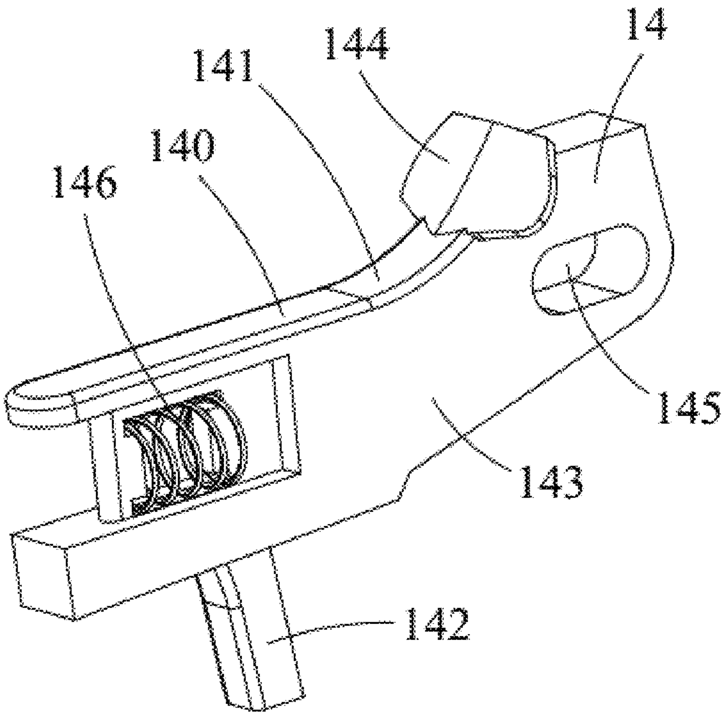
FIG. 6 is a perspective diagram of a locking switch shown in FIG. 3.
Figure 7:
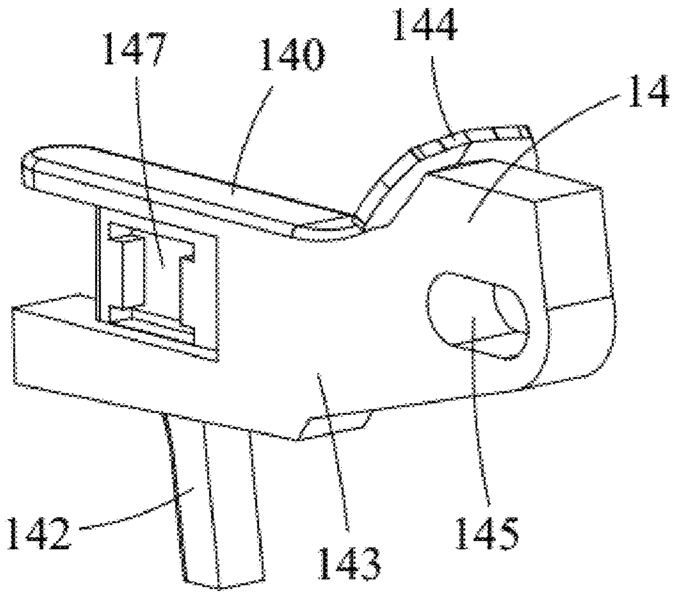
FIG. 7 is a perspective diagram of the locking switch of FIG. 6 with a second elastic element removed.

As shown in FIG. 6 and FIG. 7, the locking switch 14 is mounted on top of the housing 11 and can move in a direction parallel to the longitudinal axis with respect to the housing 11. The locking switch 14 includes a first operating part 141 which protrudes above the housing 11, an abutting part 142 which is in contact with the start switch 13, and a main body part 143 which connects the first operating part 141 and the abutting part 142. The main body part 143 is mounted on the convex column 116, thereby the main body part 143 can move in a direction parallel to the longitudinal axis with respect to the housing 11. Then synchronously driving the abutting part 142 to move in a direction parallel to the longitudinal axis while the first operating part 141 is pushed to move in a direction parallel to the longitudinal axis.

The first operating part 141 includes a first operating surface 140 which extends in a direction parallel to the longitudinal axis, and a second operating surface 144 which is located at a front end of the first operating surface 140 (near one side of the main control switch 12). The second operating surface 144 is configured to form an angle with the longitudinal axis and has an increased width in a direction perpendicular to the longitudinal axis with respect to the first operating surface 140. It is convenient for operator to apply a thrust to push the main body part 143 to slide forward in a direction parallel to the longitudinal axis by the first operating surface 140 and the second operating surface 144. Certainly, to facilitate operator to apply horizontal thrust, a structure such as a surface texture for increasing friction force may also be added on the outer surface of the first operating part 141.

The abutting part 142 and the main body part 143 are both housed in the housing 11 and extend from the bottom of the first operating part 141 toward the start switch 13. In this embodiment, the abutting part 142 extends downward in the vertical direction to abut the start switch 13 in the vertical direction. The front end of the main body part 143 is provided with a sliding groove 145 which is used for the convex column 116 to pass through. The sliding groove 145 extends in a direction parallel to the longitudinal axis. When the first operating part 141 is pushed to move, the convex column 116 can slide along the sliding groove 145. Certainly, the sliding groove 145 may also be used to limit the movement distance of the locking switch 14.

The locking switch 14 further includes a second elastic element 146. One end of the second elastic element 146 is fixed to the main body part 143, and the other end is fixed to the first housing 112. When the locking switch 14 moves in a direction parallel to the longitudinal axis, the second elastic element 146 is switched between a stretched state and a released state. Preferably, the main body part 143 is provided with an I-shaped limiting slot 147 to fix one end of the second elastic element 146 on the main body part 143.

In the embodiment, the second elastic element 146 and the sliding groove 145 are respectively located at the different ends of the main body part 143. The sliding groove 145 is disposed at one end (the front end) of the main body part 143 near the main control switch 12. And the second elastic element 146 is disposed at one end (the rear end) of the main body part 143 away from the main control switch 12. After pushing the first operating part 141, the second elastic element 146 is stretched. After releasing the first operating part 141, the locking switch 14 may return to the initial position (the locking position) under the restoring force of the second elastic element 146.

In the embodiment, the second elastic member 146 is a coil spring mainly for driving the locking switch 14 to reset. Certainly, other components which are capable of implementing the reset function may also be used to replace the second elastic element 146, not limited herein. In addition, the second elastic element 146 may also be disposed on one side (the front end) of the main body part 143 near the main control switch 12. At which point the reset of the locking switch 14 can also be implemented, not be described in detail herein.

In this embodiment, the main control switch 12 is located at the front end of the housing 11. When the locking switch 14 is in the locking position, the distance between the locking switch 14 and the main control switch 12 is defined as a first distance. When the locking switch 14 is in the releasing position, the distance between the locking switch 14 and the main control switch 12 is defined as a second distance. And the first distance is greater than the second distance.

What needs illustration is that: when the locking switch 14 is in the locking position, the abutting part 142 abuts against an end surface 138 of the second operating part 132, and the start switch 13 is in a locked state. The locking switch 14 switches from the locking position to the releasing position, only a thrust is needed to apply on the first operating part 141 to make the whole first operating part 141 move toward one side of the main control switch 12. At this moment, the abutting part 142 may move synchronously under the driving of the first operating part 141 until the abutting part 142 is located above the containing cavity 135 and disengaged from the end surface 138 of the second operating part 132. At which point the locking switch 14 releases the lock of the starting switch 13, the locking switch 14 is in the releasing position, and the start switch 13 is in the released state. Before the second operating part 132 is operated, the abutting part 142 is located outside the containing cavity 135. After the second operating part 132 is operated, the abutting part 142 protrudes and is housed within the containing cavity 135. At this moment the contact part 131 may trigger the telescopic arm 122 of the main control switch 12 to turn on the main control switch 12. If a continuous pressure is applied to the second operating part 132 to keep the main control switch 12 being turned on, the third side wall 139 at the rear end of the containing cavity 135 may hold the locking switch 14 in the releasing position, thereby the user only applies the holding force to keep the power tool working. The user experience will be improved.

The starting method of the switch assembly 10 mainly includes:

applying a thrust on the locking switch 14 in a direction parallel to the longitudinal axis until the locking switch 14 is moved from the locking position to the releasing position, so that then the locking switch 14 is disengaged from the start switch 13, releasing the limit of the locking switch 14 to the start switch 13.

operating (grip upward) the second operating part 132 (the first end 130) of the start switch 13 to make the start switch 13 rotate about the pivot 115 with respect to the housing 11, until the contact part 131 (the second end 130') of the start switch 13 triggers the main control switch 12 to turn on.

Specifically, in the initial state shown in FIG. 3, the locking switch 14 is in the locking position, the abutting part 142 of the locking switch 14 abuts against the end face 138 of the second operating part 132 in the vertical direction. Thereby limiting the start switch 13 to rotate about the pivot 115. In this case, even if the locking switch 14 and/or the start switch 13 may be touched by mistake, the main control switch 12 cannot be turned on and the power tool can remain in a non-used state.

When using the power tool, firstly, a horizontal thrust should be applied to the first operating part 141 to make the whole first operating part 141 move horizontally toward one side of the main control switch 12. At this time, the abutting part 142 would be driven to move synchronously by the first operating part 141 until the abutting part 142 is disengaged from the end surface 138. At which point the second elastic element 146 is stretched and deformed, the locking switch 14 is switched from the locking position to the releasing position. After that pressing the second operating part 132 upward (grip) to enable the whole start switch 13 to rotate with respect to the housing 11 until the contact part 131 triggers the telescopic arm 122 to turn on the main control switch 12. At this moment, the motor starts to rotate, and the power tool starts to work normally.

After use, the locking switch 14 and the start switch 13 are released at the same time. And the start switch 13 can be restored to the initial state under the action of the restoring forces of the telescopic arm 122 and the first elastic element. In the meantime, under the action of the elastic force of the second elastic element 146, the whole locking switch 14 is moved backward until the abutting part 142 abuts against the end face 138 of the second operating part 132 again. Meanwhile the locking switch 14 is in the locking position again.

In conclusion, the switch assembly 10 of the disclosure, in a non-use state, can utilize the mutual abutment of the start switch 13 and the locking switch 14 to enable the locking switch 14 to be in the locking position, and the start switch 13 to be in a clocked state. And then the main control switch 12 cannot be started, the power tool remains in a non-use state. When starting the switch assembly 10 normally, pushing the locking switch 14 horizontally until the mutual abutment of the locking switch 14 and the start switch 13 is released, and then pressing the start switch 13 to turn on the main control switch 12 to enable the power tool to work normally. Compared with the conventional power tools, the disclosure is simple in structure and convenient to operate, and the switch assembly 10 is in a locked state all the time when in a non-use state. Inadvertent pressing cannot cause the abnormal start-up. That will prevent the start switch 13 from being actuated by mistake to maintain a high safety coefficient.

While the disclosure has been described in detail regarding preferred embodiments, those skilled in the art can easily understand other advantages and effects of the disclosure from the content disclosed in this specification. The disclosure can be implemented or applied through other different specific embodiments, and various details in the specification can be modified or changed based on different viewpoints and applications without departing from the spirit of the disclosure.

What is claimed is:

1. A switch assembly, comprising:

a housing, extending along a longitudinal axis;

a main control switch, housed within the housing;

a locking switch, slidably connected to the housing and movable between a locking position and a releasing position, wherein an angle of 0° is formed between a sliding direction of the locking switch and the longitudinal axis; and a start switch, rotatably connected with the housing by a pivot, wherein the locking switch is in contact with the start switch when the locking switch is in the locking position and the start switch is in a locked state, and the locking switch is disengaged from the start switch when the locking switch is in the releasing position and the start switch is in a released state;

wherein the locking switch comprises:

a first operating part, protruding from the housing;

an abutting part, housed within the housing; and a main body part connecting the first operating part and the abutting part, wherein the abutting part extends from the first operating part toward the start switch, and the abutting part is in contact with the start switch when the locking switch is in the locking position;

wherein the start switch comprises:

a contact part, disposed within the housing; and a second operating part, protruding from the housing, wherein the contact part is in contact with the main control switch, and the second operating part comprises an end surface, wherein the abutting part is in contact with the end surface of the second operating part when the locking switch is in the locking position, and the abutting part is disengaged from the end surface of the second operating part when the locking switch is in the releasing position, and wherein the second operating part is provided with a containing cavity for containing the abutting part;

wherein one end of the main body part is provided with a sliding groove which extends in a direction parallel to the longitudinal axis, and a convex column is arranged on an inside wall of the housing and penetrates through the sliding groove;

wherein the main body part is capable of moving in a direction parallel to the longitudinal axis with respect to the housing, then synchronously drive the abutting part to move in a direction parallel to the longitudinal axis while the first operating part is pushed to move in a direction parallel to the longitudinal axis;

wherein the containing cavity is located among a first side wall, a second side wall and a third side wall;

wherein after the second operating part is operated and the locking switch is in the releasing position, the abutting part protrudes into and is housed within the containing cavity; and wherein the third side wall at a rear end of the containing cavity is configured to hold the locking switch in the releasing position when a continuous pressure is applied to the second operating part to keep the main control switch being turned on.

2. The switch assembly of claim 1, wherein the start switch is disposed on a first side of the housing, the locking switch and the main control switch are disposed on a second side of the housing.

3. The switch assembly of claim 1, wherein the pivot is perpendicular to the longitudinal axis.

4. The switch assembly of claim 1, wherein the first operating part comprises a first operating surface and a second operating surface, wherein the first operating surface extends in a direction parallel to the longitudinal axis, and the second operating surface extends in a direction which forms an angle with the longitudinal axis; wherein the width of the second operating surface is greater than the width of the first operating surface in a direction perpendicular to the longitudinal axis.

5. The switch assembly of claim 1, wherein the start switch further comprises a middle part, wherein the middle part connects the contact part and the second operating part, and is provided with a connecting hole, and the connecting hole connects to the pivot which is arranged on an inside wall of the housing.

6. The switch assembly of claim 1, wherein the locking switch further comprises an elastic element, wherein one end of the elastic element is fixed to the main body part, the other end of the elastic element is fixed to the housing, and when the locking switch is switched between the locking position and the releasing position, the elastic element is switched between a stretched state and a released state.

7. A power tool, comprising:

a work assembly, for implementing the functions of the power tool;

a drive assembly, connected with the work assembly to drive the work assembly to move;

a battery assembly, supplying power for the drive assembly; and a switch assembly, comprising:

a housing, extending along a longitudinal axis;

a main control switch, housed within the housing;

a locking switch, connected with the housing in a sliding manner and movable between a locking position and a releasing position, wherein an angle of 0° is formed between a sliding direction of the locking switch and the longitudinal axis; and a start switch, rotatably connected with the housing by a pivot, wherein the locking switch is in contact with the start switch when the locking switch is in the locking position and the start switch is in a locked state, and the locking switch is disengaged from the start switch when the locking switch is in the releasing position and the start switch is in a released state;

wherein the locking switch comprises:

a first operating part, protruding from the housing;

an abutting part, housed in the housing; and a main body part connecting the first operating part and the abutting part, wherein the abutting part extends from the first operating portion toward the start switch, and the abutting part is in contact with the start switch when the locking switch is in the locking position;

wherein the start switch comprises:

a contact part, disposed within the housing; and a second operating part, protruding from the housing, wherein the contact part is in contact with the main control switch, and the second operating part comprises an end surface, wherein the abutting part is in contact with the end surface of the second operating part when the locking switch is in the locking position, and the abutting part is disengaged from the end surface of the second operating part when the locking switch is in the releasing position, and wherein the second operating part is provided with a containing cavity for containing the abutting part;

wherein one end of the main body part is provided with a sliding groove which extends in a direction parallel to the longitudinal axis, and a convex column is arranged on an inside wall of the housing and penetrates through the sliding groove;

wherein the main body part is capable of moving in a direction parallel to the longitudinal axis with respect to the housing, then synchronously drive the abutting part to move in a direction parallel to the longitudinal axis while the first operating part is pushed to move in a direction parallel to the longitudinal axis;

wherein the containing cavity is located among a first side wall, a second side wall and a third side wall;

wherein after the second operating part is operated and the locking switch is in the releasing position, the abutting part protrudes into and is housed within the containing cavity; and wherein the third side wall at a rear end of the containing cavity is configured to hold the locking switch in the releasing position when a continuous pressure is applied to the second operating part to keep the main control switch being turned on.

* * * * *